United States Patent

Edwards et al.

[15] 3,671,799

[45] June 20, 1972

[54] TELEVISION RECEIVERS UTILIZING TRANSISTORS CONNECTED AS A DARLINGTON PAIR

[72] Inventors: William Thomas Edwards, Harrow; James Kirwan, Northwood, both of England

[73] Assignee: Communications Patents Limited

[22] Filed: Jan. 5, 1970

[21] Appl. No.: 566

[52] U.S. Cl. ....................315/27 TD

[51] Int. Cl. ....................H01j 29/70

[58] Field of Search ....................315/27 TD, 6 DC, 6 LC

[56] References Cited

UNITED STATES PATENTS

| | | | |
|---|---|---|---|
| 2,954,504 | 9/1960 | Saudinaitis et al | 315/27 TD |
| 3,488,554 | 1/1970 | Voige | 315/27 R |
| 2,984,788 | 5/1961 | Korff et al. | 315/27 R |
| 3,134,928 | 5/1964 | Freedman | 315/27 TD |
| 3,111,602 | 11/1963 | Hellstrom et al. | 315/27 R |
| 3,544,811 | 12/1970 | McDonald et al. | 315/27 TD |

*Primary Examiner*—Benjamin R. Padgett
*Assistant Examiner*—J. M. Potenza
*Attorney*—Laurence R. Brown

[57] ABSTRACT

A transistorized vertical deflection circuit for television receivers is disclosed, where two transistors are connected as a Darlington pair to drive a d-c coupled deflection transformer-choke arrangement and the scan coils. To linearize the scan and control its amplitude two sources of variable d-c are coupled to the input transistor. A first source is rectified signals from the transformer-choke and the second source is the potential of the choke driving transistor.

6 Claims, 6 Drawing Figures

INVENTORS
William T. Edwards & James Kirwan
BY Laurence R. Brown
ATTORNEY

TELEVISION RECEIVERS UTILIZING TRANSISTORS CONNECTED AS A DARLINGTON PAIR

This invention relates to television receivers and is particularly concerned with vertical deflection arrangements therefor.

It is an object of the present invention to provide a vertical deflection arrangement for a television receiver in which semiconductor devices such as transistors are employed, and in which the linearity of scan is controlled in a simple and convenient manner.

Accordingly the invention provides a television receiver which includes a vertical deflection arrangement having an amplitude control which is connected in shunt with a source of variable potential, said variable potential being derived from the output signal of the vertical deflection arrangement.

The invention also provides a television receiver which includes a vertical deflection arrangement in which two signal paths are provided from the output of said vertical deflection arrangement which in association with a rectifying device provide a potential which is dependent upon the amplitude of the output signal of said deflection arrangement and which is arranged to control the amplitude of said output signal.

Figure 1:
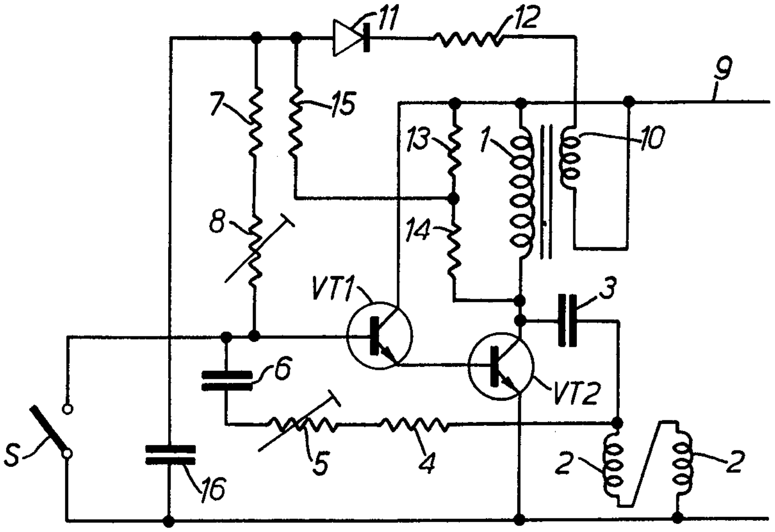

In order than the invention may be more readily understood one particular embodiment thereof will now be described, by way of example only, with reference to the accompanying drawings in which :

FIG. 1 is a circuit diagram of part of a television receiver showing the vertical deflection arrangement thereof and, FIGS. 2–6 are diagrams of wave forms associated with the circuit arrangements of FIG. 1.

In the circuit shown in FIG. 1 the two transistors VT 1 and VT 2 are connected as a Darlington pair. The collector of VT 2 is arranged to work into a load impedence formed by the choke 1, the scan coils 2 being shunt fed from the collector of VT 2 through the capacitor 3. A feed back path is established between the junction of the scan coils 2 and capacitor 3 to the base of VT 1 through a signal path comprising the series combination of a fixed resistor 4 an adjustable resistor 5 and a capacitor 6 so that the arrangement functions as a so-called Miller-integrator. The amplitude of the output signal available at the collector of VT 2 is determined by the direct current potential applied to the base of VT 1 through the series combination of the fixed resistor 7 and the adjustable resistor 8. Instead of the terminal of the resistor 7 which is remote from the base of the VT 1 being connected to a source of fixed potential such, for example, as the supply line 9 it is connected to a source of variable potential so that the amplitude of the output signal can be controlled in a continuous manner so that a substantially linear scan may be effected.

This source of variable potential is derived from the output signal by means of two signal paths associated with a rectifying device. The first signal path is formed by the winding 10 arranged on the collector load choke 1, the potentials developed across said winding during scanning being rectified by rectifying device 11. The proportion of the potential developed across the winding 10 which is applied to the rectifying device 11 is determined by the value of the resistor 12. The variable potential provided by the rectifying device 11 is modified in accordance with a direct current potential derived over the second signal path. This second signal path comprises the resistors 13, 14 in shunt with the choke 1 and the series resistor 15. The ratio of the resistors 13, 14 determine the proportion of the direct current potential at the collector of VT 2 which is applied to the anode terminal of the rectifying device 11 while the resistor 15 minimises the shunting effect of the resistors 13, 14 on the potential provided over the first signal path by the rectifying device 11. The variations of the combined variable potential are further modified by a capacitor 16.

The speed of operation of the scanning arrangement is determined by the switch means 5, which in practice comprises an electronic switch utilizing, for example, one or more semi-conductor devices. This switch serves effectively to connect the base of VT 1 to a reference potential at the end of each scan cycle. Opening of the switch 6 initiates a fresh scan as determined largely by the time constant of the resistors 4, 5 and the capacitor 6.

The operation of the circuit shown in FIG. 1 may be more easily understood by reference to the waveforms shown in FIGS. 2–6 with a knowledge of the functioning of the circuit without the corrections of the present invention applied. Firstly, if a linear scanning current is generated in the scanning coils 2 the electron beam of the cathode ray tube will not traverse its flat screen in a linear manner. Secondly, in practice it is not possible to generate a perfectly linear scanning current because during the scan period the transistor VT 2 is called upon to pass greater and greater collector current as a result of which its current gain progressively falls thus limiting the available output current in the scanning coils 2. Furthermore, as the current through the transistor VT 2 rises there is a progressive drop in its collector potential due to the finite resistance of the choke 1. Thus in practice, the scanning current which can be passed through the scanning coils 2 progressively falls during the scan period. The variable potential provided by the present invention which controls the output signal available at the collector of VT 2 has such a form as will simultaneously compensate for both these shortcomings of the basic circuit arrangements.

Figure 2:
Figure 3:
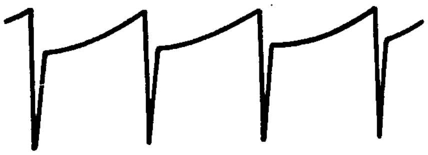
Figure 4:
Figure 5:
Figure 6:

The waveform shown in FIG. 2 occurs at the collector of VT 2. The large high amplitude spikes occur during the flyback period as a result of the back-emf generated across the choke 1 when the transistor VT 2 switches off. The polarity of the winding 10 is arranged to provide at its terminal remote from the supply line, the inverse waveform as shown in FIG. 3. As will be seen, this waveform has a slowly rising characteristic. When rectified by the rectifying device 11 and modified by the capacitor 16, the waveform of FIG. 3 is modified at the anode of the rectifying device 11 to the form shown in FIG. 4. As will be seen, this waveform initially rises at a steady rate and then rises at a progressively falling rate. The waveform required to be applied across the height determining resistors 7,8 is required to reach a peak about two-thirds the way through the frame scan and then fall from this peak value. The waveform present at the anode of the rectifying device 11 and as shown in FIG. 4 can be modified in this way by combining it with a proportion of the descending waveform present at the collector of transistor VT 2. This waveform corresponds approximately to the long slowly falling parts of the waveform shown in FIG. 2. The resulting waveform applied across the resistors 7, 8 is thus of the kind shown in FIG. 6.

Thus, by the means described, the linear variation of current with time through the scan coils 2, is modified both at the beginning and end of the scanning period so as to provide a non-linear scanning current which causes the electron beam of the cathode ray tube of the television receiver to traverse the flat screen of that tube in a linear manner.

The advantages of the circuit arrangement described above are that during the flyback interval the transistor VT 2 may be fully cut off, that is, the capacitor 6 may be returned to earth potential instead of to a finite potential above the earth thus lowering the power dissipation in the transistors, particularly VT 2. This lowering of the dissipation improves the reliability of the scanning arrangement and at the same time reduces its temperature rise and current consumption. A further advantage is that the capacitor 6 which largely determines the frequency of scanning waveform can in practical circumstances have a relatively low value, such for example, as about 0.47 mF. This enables the employment of a capacitor having a reasonable temperature stability. Heretofor, the value of the timing capacitor in conventional circuit arrangements has required to be of the order of 100 mF or more which in practical terms necessitates the use of an electrolytic capacitor with its consequent poor temperature co-efficient.

We claim:

1. A vertical deflection arrangement for a television receiver comprising in combination, a reference potential, vertical deflection coils coupled to said reference potential, a transistor deflection driver circuit, a capacitor coupling said transistor circuit output to said deflection coils, an input transistor circuit with an output circuit coupled to the input of said transistor driver circuit, a feedback circuit comprising a resistance and a capacitance coupled from the coils to the input of the first transistor circuit, a transformer coupled to the output of the transistor deflection driver circuit, a primary and secondary winding on said transformer, a rectifier circuit coupled to said secondary winding to rectify signals thereof, a variable amplitude control resistor coupling said rectifier to the input circuit of said input transistor circuit, a resistive circuit deriving a potential from said primary winding coupled to said amplitude control resistor, a switching circuit in the input of said input transistor circuit coupled to said reference potential, and a capacitor coupled from said amplitude control resistor to said reference potential.

2. A television receiver as claimed in claim 1, wherein the second of said two signal paths includes circuit means for deriving a proportion of the direct current potential appearing across a primary winding of said transformer.

3. A television receiver as claimed in claim 2, wherein said circuit means comprise a series combination of resistors arranged in shunt with said primary winding.

4. A television receiver as claimed in claim 2 wherein the variable potential provided by said rectifying device in said first signal path is arranged to be modified in accordance with the proportion of the direct current potential derived over said second signal path.

5. A television receiver as claimed in claim 4, including a circuit combining the variations of the variable potential of said two signal paths and a reactive circuit causing both signals to be further modified by means of a reactive component.

6. A television receiver as claimed in claim 5, wherein said reactive component comprises a capacitor arranged in shunt with the circuit combining variable potential.

* * * * *